No. 859,945. PATENTED JULY 16, 1907.
T. B. JEFFERY.
DRIVING CLUTCH FOR MECHANICALLY PROPELLED VEHICLES.
APPLICATION FILED AUG. 28, 1905.
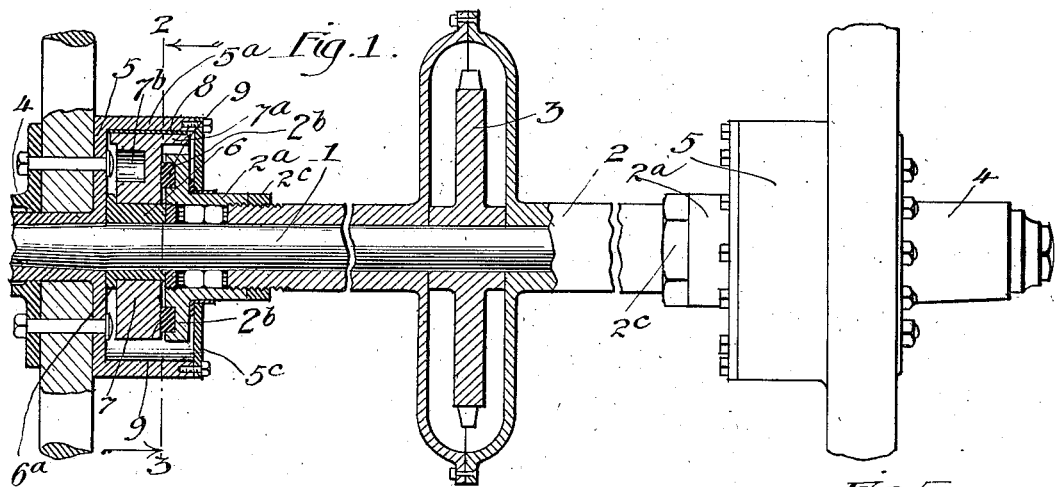
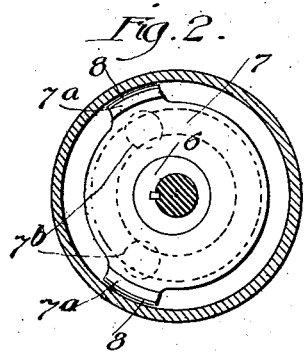
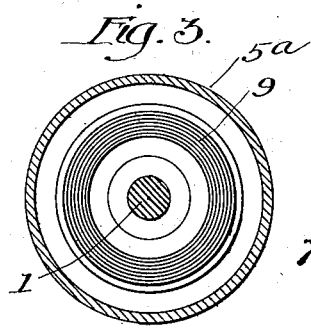
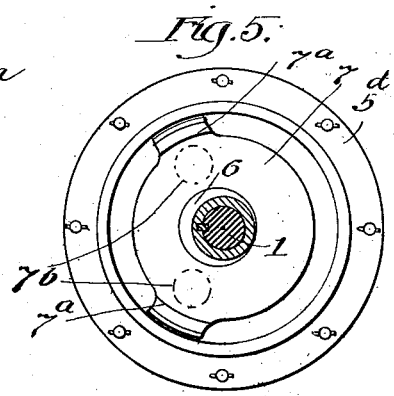
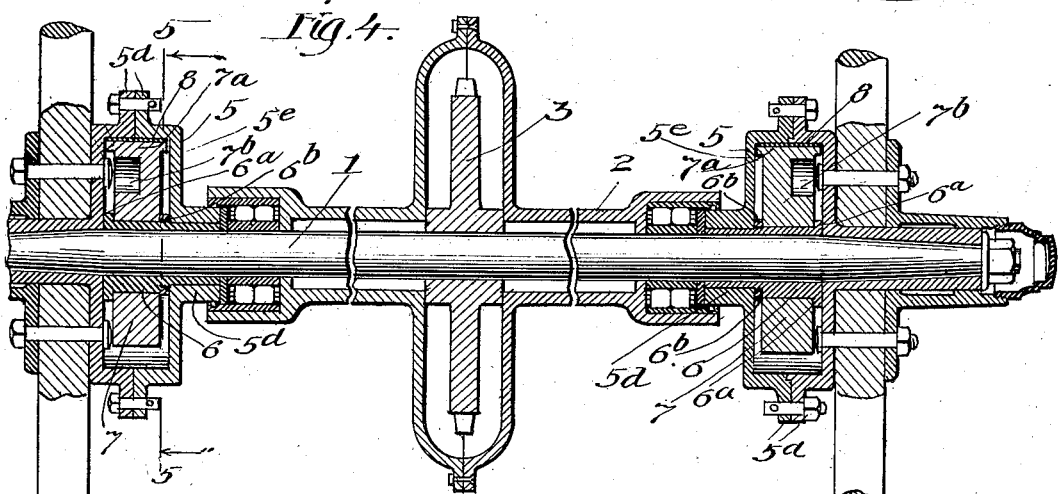
Witnesses:
Frank Blanchard
J. S. Abbott
Inventor:
Thos. B. Jeffery
By Burton & Burton
his Attorneys.

UNITED STATES PATENT OFFICE.

THOMAS B. JEFFERY, OF KENOSHA, WISCONSIN.

DRIVING-CLUTCH FOR MECHANICALLY-PROPELLED VEHICLES.

No. 859,945.      Specification of Letters Patent.      Patented July 16, 1907.

Application filed August 28, 1905. Serial No. 276,031.

*To all whom it may concern:*

Be it known that I, THOMAS B. JEFFERY, a citizen of the United States, residing at Kenosha, in the county of Kenosha and State of Wisconsin, have invented new and useful Improvements in Driving-Clutches for Mechanically-Propelled Vehicles, of which the following is a specification, reference being had to the accompanying drawings, forming a part thereof.

The purpose of this invention is to provide an improved means for connecting the wheels of a mechanically-propelled vehicle with the driving member or axle in such manner as to permit the free rotation of either wheel faster than the axle in either direction while insuring positive gripping of the driven to the driving member in either direction.

It consists of the features of construction set out in the claims.

In the drawings: Figure 1 is a sectional elevation of the driving member or axle and parts of the two driven wheels thereon, section being made axially through a portion of the length of the axle and parts mounted thereon. Fig. 2 is a section at the line 2—3 on Fig. 1 looking in the direction of the arrow 2. Fig. 3 is a section of the same figure looking in the direction of the arrow 3. Fig. 4 is a view similar to Fig. 1, showing a modified form of the invention. Fig. 5 is a section at the line 5—5 on Fig. 4.

In one form in which my invention may be embodied, the driving member or axle, 1, is mounted and housed in any suitable or customary manner in the cross bar, 2, of the frame of the vehicle and driven positively by the power communicated through the sprocket wheel, 3, rigid on said axle. A hub, 4, of the wheel or driven member is expanded to form a clutch housing 5. The axle or driving member, 1, has within this clutch housing an eccentric collar, 6, keyed fast on the axle. Journaled for swinging or rocking on this eccentric collar is the double-headed clutch dog, 7, whose two heads, 7ᵃ, 7ᵃ, are faced at their ends with leather or other suitable material, 8, to give frictional grip. These two heads are located with respect to the eccentric so that at one position of the dog on the eccentric collar both of said gripping faces may be just barely out of contact with the inner surface of the encompassing annular flange, 5ᵃ, of the housing, 5, and so that if the dog is rocked a very short distance in one direction about the eccentric one of the gripping faces, 8, will be forced out into driving engagement with said flange, and if the dog is rocked a short distance in the opposite direction the other face, 8, will be similarly forced out into driving engagement with the flange, and thereby the wheel will be driven with the shaft by the grip of the dog on the flange in whichever direction the shaft is rotated.

It will be understood that upon the commencement of rotation of the shaft, any friction operating to resist or retard the movement of the dog with the shaft will tend to rock the dog on the eccentric back relatively to the shaft's motion, and thus crowd the one or the other of the gripping faces, 8, out into driving engagement as indicated. To thus retard or resist frictionally the movement of the dog with the shaft and so to cause the engagement necessary for driving, the bearing, 2ᵃ, of the shaft, 1, on the frame bar, 2, is provided at the extremity with an annular flange, 2ᵇ, which faces the inner side of the dog, 7, and in the face of this flange there is mounted a frictional ring, 9, which may be of leather, fiber or other suitable material to give good frictional engagement against the side of the dog. The eccentric, 6, has a flange, 6ᵃ, at the outer end which forms a lateral stop shoulder for the dog, 7. The dog is thus laterally held between the said stop shoulder and the friction ring, 9, and any dersired amount of frictional engagement of the ring upon the face of the dog may be obtained by corresponding adjustment of the parts which are provided for stopping the shaft, 1, longitudinally in the bearing. This adjustment is most effectively obtained by making the bearing, 2ᵃ, separable from the cross bar, 2, and adapted to be attached thereto by interiorly threading the bearing and exteriorly threading the end of the arm and screwing the two together, as seen in Fig. 1, securing the adjustment by lock nut, 2ᶜ. It will be seen that by setting the two opposite bearings, 2ᵃ, apart on the cross bar, 2, the friction rings, 9, for the two wheels will be pressed outwardly and against their respective dogs, 7, to any desired extent.

Upon consideration of this device, it will be seen that in turning corners the inside wheel will be the driving wheel, and the outside wheel, being revolved by its contact with the ground more rapidly than the inside wheel and axle, will free itself from the grip of the dog and maintain such higher speed, because its rotation in the same direction as the axle and dog, but at a higher speed than the latter, has the same effect, so far as the gripping of the dog is concerned, as the reverse movement of the dog; that is, the inner member—axle and dog—while actually revolving forward, having reverse movement relatively to the outer member which is revolving in the same direction at a higher rate of speed. An absolute reverse movement of the shaft itself relative to the bearings, as above explained, would cause the dog to grip the outer or driven member positively for reverse movement, but this result does not follow from the over-speed of the outer or driven member, because the driven member has still absolute forward movement with respect to the bearing and friction ring, 9, which prevents it from obtaining any reverse rocking on the eccentric which would be necessary in order to give it the reverse driving engagement with the outer gripping member. The device, therefore, accomplishes the purposes stated, of permitting either wheel to obtain a higher speed than the axle, in the same direction as the axle, in whichever direction the axle itself is revolved, while at the same time affording means for positive clutching engagement of the driving and driven members for driving in either direction. In order that the gripping of the clutch may not be produced by gravity, causing it to swing one way or the other on the eccentric when from any cause the friction of the ring, 9, should be lost, as by the ring becoming compressed or the parts otherwise worn so as to prevent the necessary lateral pressure, the dog, 7, is preferably made so as to be balanced at all positions on the eccentric. This is easily accomplished notwithstanding the necessary slight protrusion of the two heads beyond the remainder of the periphery by slightly lightening the dog at the side on which those heads project by boring out, as shown at 7$^b$, until the dog is perfectly balanced. Any other mode of lightening this side may be substituted for the expedient shown.

In Figs. 4 and 5, there is shown a modification of this invention which has certain advantages. In this form, the lateral friction of the ring, 9, is dispensed with. The dog is hung upon the eccentric between the stop flange, 6$^a$, at one side and a retaining collar, 6$^b$, at the opposite side which is screwed on to the eccentric so as not to bind the dog, but merely to check it against lateral movement, causing it to be journaled as nearly as possible without friction on the eccentric and to be held entirely out of all possible lateral contact with the driven member, its only contact except with the eccentric on which it is journaled being that which it obtains at the gripping heads whenever they come into gripping contact with the encompassing flange of the driven member. This construction dispenses with the necessity for the flange, 2$^b$, on the bearing element, 2, of the vehicle, and thereby with the necessity for extending said bearing element toward the side of the dog. I prefer to give the driven member a bearing on the shaft at the inner side of the clutch housing, and for that purpose, in this form, instead of employing the mere guard plate, 5$^c$, shown in Fig. 1, at the inner side of the clutch housing, 5, I form said housing in two parts which may be parted at transverse plane about midway in the width and provided with lugs, 5$^d$, for bolting them together, as shown in Fig. 4; the inner member, 5$^e$, of such two-part housing being provided with a sleeve or hub, 5$^d$, which obtains bearing on the shaft at the inner side of the eccentric. As a matter of convenience in construction, the eccentric may be formed as a sleeve or collar keyed on the shaft and having a portion concentric with the shaft and thereby virtually mere enlargement of it at the inner end, which becomes the direct seat or bearing of the hub or sleeve, 5$^d$, of the inner member of the housing. This, however, is a mere preferential mechanical expedient. In this form shown in Figs. 4 and 5, it will be seen that over-speed of the outer member has no tendency to move the clutch, except so far as it is moved to disengage the driven member from it at the outer periphery, and the clutch being balanced, as in the other construction, on the eccentric and being carried only by the slight friction on the eccentric, will tend by inertia to rock back relatively to the driving shaft, thus causing it to tend to thrust its heads out for gripping, as in the other construction in which it is definitely retarded by the lateral frictional engagement. In practice, the engagement of the dog in this form, whether for driving forward or backward, is found to be substantially as prompt as when it is exposed to lateral friction, and the entire absence of any frictional engagement of the driven member, except when it is gripped therewith, prevents it from being carried with the driven member by the over-speed of the latter to an extent which would cause it to grip said driven member as for opposite rotation checking its over-speed.

I claim:—

1. The combination with the driving shaft and a driven member of a power-propelled vehicle of an eccentric fixed on the shaft; a dog journaled on the eccentric; a flange on the driven member which is circular about the axis of the shaft to which the dog is thrust by movement about the eccentric for driving engagement with said driven member, the shaft bearing having frictional contact with the dog for retarding its rotation with the shaft.

2. The combination with a driving shaft and the driven member of a power-propelled vehicle of an eccentric fixed on the shaft; a flange on the driven member encompassing the eccentric; a dog mounted on the eccentric having two heads adapted to be respectively thrust into engagement with the flange by the movement of the dog about the eccentric in opposite directions, and means fixed with respect to the shaft bearing for frictional engagement with the dog.

3. In combination with the driving shaft and a driven member of a power-propelled vehicle, an eccentric fixed on the shaft having at one end a flange forming laterally a stop shoulder; a dog on the eccentric stopped laterally against the shoulder; an annular flange on the driven member circular about the axis of the shaft and encompassing the eccentric and the dog and adapted to be frictionally engaged by the dog, the bearing of the shaft having the flange at the opposite side of the dog from said shoulder, and a frictional packing ring seated in the face of the flange for frictional bearing against the face of the dog, and means for adjusting the parts to press the dog between the stop shoulder at one side and the frictional flange at the opposite side.

4. The combination with a driving shaft and driven member of a power-propelled vehicle of a clutch element journaled upon an eccentric bearing on the shaft and balanced thereon at all positions of its movement thereabout, the driven member having a flange adapted to be engaged by said clutch element at the periphery of the latter, the clutch and the driven member being substantially free from contact with each other except at such gripping periphery.

5. In combination with a driving shaft and driven member of a power-propelled vehicle of a clutch element journaled upon an eccentric bearing on the shaft and adapted thereby to be thrust eccentrically into engagement with the driven member, the contact of said clutch and driven member being limited to that which occurs from such eccentric thrusting of the clutch element for gripping the driven member.

6. The combination with the driving shaft and the driven member of a power-propelled vehicle of a clutch element on the driving member and a coöperating clutch element on the driven member, one of said elements being located within the other; lateral means for frictionally retarding the rotation of the inner clutch element, and means by which it is thrust eccentrically when thus retarded.

7. The combination with the driving shaft and the driven member of a power-propelled vehicle, of an annular clutch element on the driving member; a coöperating annular clutch element carried by the driven member; lateral means for frictionally retarding the rotation of the clutch element which is carried by the driven member, and an eccentric on the shaft for thrusting said element eccentrically when thus retarded.

In testimony whereof, I have hereunto set my hand in the presence of two witnesses, at Kenosha, Wisconsin, this 18th day of August, A. D., 1905.

THOMAS B. JEFFERY.

Witnesses:
H. W. JEFFERY,
GEO. H. EDDY.